US012175555B2

(12) United States Patent
Rodriguez Rosas

(10) Patent No.: US 12,175,555 B2
(45) Date of Patent: Dec. 24, 2024

(54) CAMERAS AND LIGHTS POSITIONING SYSTEM FOR HOSE INSPECTION DURING AIR-TO-AIR REFUELING AND INSPECTION PROCEDURES

(71) Applicant: QUANDUM AEROSPACE S.L., Campanillas (ES)

(72) Inventor: Rafael Rodriguez Rosas, Málaga (ES)

(73) Assignee: QUANDUM AEROSPACE S. L., Campanillas (ES)

( * ) Notice: Subject to any disclaimer, the term of this patent is extended or adjusted under 35 U.S.C. 154(b) by 71 days.

(21) Appl. No.: 17/778,012

(22) PCT Filed: Jan. 13, 2020

(86) PCT No.: PCT/ES2020/070015
§ 371 (c)(1),
(2) Date: May 19, 2022

(87) PCT Pub. No.: WO2021/140259
PCT Pub. Date: Jul. 15, 2021

(65) Prior Publication Data
US 2022/0411101 A1    Dec. 29, 2022

(30) Foreign Application Priority Data
Jan. 11, 2020    (ES) ................ ES202030011

(51) Int. Cl.
*G06T 7/73*  (2017.01)
*B64D 47/08* (2006.01)
*G01N 21/952* (2006.01)

(52) U.S. Cl.
CPC ............... *G06T 7/73* (2017.01); *B64D 47/08* (2013.01); *G01N 21/952* (2013.01); *G06T 2207/30252* (2013.01)

(58) Field of Classification Search
CPC ........ B64D 39/00; B64D 39/02; B64D 47/08; B64F 5/40; B64F 5/60; G01N 21/952; B64C 2001/009
See application file for complete search history.

(56) References Cited

U.S. PATENT DOCUMENTS 3,584,167 A    6/1971  Nicolas
7,474,416 B2 * 1/2009  Lindner ............... G01N 21/952
                                              356/601
(Continued)

FOREIGN PATENT DOCUMENTS

CN    108627518 A    10/2018

*Primary Examiner* — Joshua J Michener
*Assistant Examiner* — Colin Zohoori
(74) *Attorney, Agent, or Firm* — Dickinson Wright PLLC

(57) ABSTRACT

Cameras and lights positioning system for hose inspection during air-to-air refueling, which comprises a substructure that can be attached to a container or capsule or Pod, one or two guidance-substructures (13) that enclose the hose, a toroid volume, to house the cameras (22) and lights (23) and a cameras and lights control subsystem. The system allows for the cameras (22) and lights (23) to maintain a fixed relative position with respect to the hose (1) during moments of imagery acquisition, despite the inclination and the five different movements that the hose has and makes, at the same time allowing protuberances (38) to pass through the system.

18 Claims, 9 Drawing Sheets

(56) References Cited

U.S. PATENT DOCUMENTS

| | | | |
|---|---|---|---|
| 10,184,858 B2* | 1/2019 | Klein | G01N 21/896 |
| 11,535,402 B2* | 12/2022 | Martin Gomez | G01M 5/0091 |
| 2011/0052039 A1 | 3/2011 | Urabe et al. | |
| 2011/0268313 A1* | 11/2011 | Winter | G01N 21/952 |
| | | | 382/100 |
| 2017/0275016 A1* | 9/2017 | Guerquin | B65H 75/4402 |
| 2019/0322489 A1* | 10/2019 | Watabe | B66B 5/02 |
| 2021/0061493 A1* | 3/2021 | Pattison | G01M 5/0091 |

* cited by examiner

CAMERAS AND LIGHTS POSITIONING SYSTEM FOR HOSE INSPECTION DURING AIR-TO-AIR REFUELING AND INSPECTION PROCEDURES

CROSS-REFERENCE TO RELATED APPLICATIONS

This application is a U.S. National Stage of International Application No. PCT/ES2020/070015, filed on Jan. 13, 2020, which claims the benefit and priority of Spanish patent application P202030011 filed on Jan. 11, 2020, the entire contents of which are incorporated herein by reference.

PURPOSE OF THE INVENTION

The purpose of this invention is a cameras and lights positioning system for hose inspection during air-to-air refueling, as well as that hose's inspection procedures.

What defines this invention are the specific structural components which enable in-flight hose inspection and allow consideration of the hose angle as it leaves the hose-drum, the vertical and horizontal movements, pitch and yaw, and of its longitudinal movement when extending or retracting. Allowing the hose to pass even when it contains irregularities expanding its diameter.

The aeronautical sector of hose and drogue air-to-air refueling is a force multiplier, as it is the answer to those probe-equipped aircraft that need in-flight refueling to complete their mission.

The air-to-air refueling hoses are quite soft and so can be easily damaged and need to be inspected regularly, to prevent major accidents from happening caused by hose damage. Surprisingly even today inspections are still carried out manually. Due to the weight and rigidity of the hose, a high number of ground crew is needed to extract it from the Pod (or the device that holds it) and visually inspect the full hose surface, in search of any damage that could be present making the hose unsafe to operate.

These inspections are done on the ground. Ironically, the inspection frequently causes more damage than using the hose during air-to-air refueling.

The object of this invention is a system that allows mounting cameras and lights inside of the Pod, for an automated image acquisition of the hose surface. The imagery enables a so-called "remote" inspection. In the future this remote inspection could be fully automated, to prevent ground crew from direct manual handling and to relieve them of the responsibility of detecting damages that occur because of its fragility.

The main objectives for an adequate inspection of the hose surface are:

1.—Obtaining imagery of the full hose surface in an automated way, without missing out on any damage, from beginning to the end and along the 360 degrees of its transverse perimeter.

2.—Obtaining imagery in an automated way, of such high-quality assuring that any existing damage on the hose surface will be shown.

As mentioned, nowadays these two objectives are met manually by a high number of ground crew, that extract the hose from the pod, dragging it partially over the ground to visually inspect it in its full length and perimeter through a tedious and expensive process, not without errors.

To meet above objectives, which is the main purpose of this invention, we use: cameras to get imagery of the full hose, either at the beginning of the air-to-air refueling or, preferably, at the end. Generally, the procedure consists of initially extending the full hose in-flight, thereafter, starting the imagery acquisition while retracting.

Therefore, this invention is part of the segment of instruments and procedures for air-to-air refueling hose inspection, during so-called hose and drogue refueling, to establish whether the hose has not been damaged too much to continue refueling.

BACKGROUND OF THE INVENTION

Most of the basic components for the hose surface inspection like cameras and lights, have been used in many other patent applications. This includes a control unit with some electronics. The radical innovation here is being able to follow the entire movement of the hose in its full range as presented in this application. In addition, benefiting from its tracking structure which enables to install cameras that will always be able to see the hose from the same angles and lights with a constant level of illumination. That consistency of illumination and acquisition combined with the method, provides a special effect that highlights all the irregularities on the hose surface, which is specifically one of the objectives of this patent. Thus, the system's arrangement of components together with the consistent illumination of the hose, will enable the imagery to frame "the photo". This way the invention is provided with special features to achieve the established objectives, despite the challenges that have required the manual inspections to still be in place.

On different occasions problems were solved with the following patents:

US 2011268313 A1 (WINTER SVEN et al.) 3 Nov. 2011
US 2012294506 A1 (VERREET ROLAND) 22 Nov. 2012,
WO 2016146703 A1 (UNIV LEUVEN KATH et al.) 22 Sep. 2016,
US 2011175997 A1 (CYBEROPTICS CORPORATION) 23 Jan. 2009, quoted Evidently, state-of-the-art technology devices for surface inspection of elongated objects are known. Such devices constitute a ring or geometrically similar toroid-shaped element, which encloses the object that needs inspection and maintains a fixed relative position in relation to the other elements. On the ring or toroid are mounted: A set of one or more image sensors that can be frame based or line based, arranged along the ring facing inwards radially towards its center, as well as a set of lights for regular or structured illumination of the object under inspection, facing inwards towards the enclosed space where this object would be located. In our case this cannot be achieved similarly to the referenced patents' descriptions due to the way the aerial refueling hose moves inside the pod.

In this case at hand, having to deal with fuel supply hoses or similar, with multiple and various movements as described, to achieve each of the two main objectives (section PURPOSE OF THE INVENTION) requires solving a series of difficulties which distinguish this case from previous cases.

First, we need to take a look at objective 1. To get an overall image of the full hose surface enabling an afterwards review, we need snapshots of the circumference for every part of its length. This in itself is no novelty. However, in our case the hose moves very quickly along an axis that forms a certain angle with the Pod's longitudinal axis. In addition, the hose moves along the transverse axes, up and down and from left to right. Furthermore, the hose exhibits changing inclinations related to the variable angle it adopts with the axes contained in the transversal plane of its longitudinal trajectory. This is associated with pitch and yaw movements of the hose. Ultimately the types and the frequency of movement make it impossible to apply any of the solutions as proposed before in referenced patents. We need to create a system that follows the hose in all its movements when it passes (movement L, FIG. 4) along our system, both in transverse movements (V and H, FIG. 4) as well as pitch and yaw (P and R, FIG. 4), while also compensating the hose's default inclination (a, FIG. 4). These movements are a result of various factors when retracting towards or extending from the drum as well as the aerodynamics of the drogue attached to the hose.

Secondly, there are serious problems in achieving objective 2. To begin with there's the fact that the hose moves quickly along an axis forming a certain angle with the Pod's longitudinal axis. In addition, there are two other aspects. For one, while the hose surface is very smooth to begin with, due to friction with its enclosing elements it is polished even more creating unwanted glare and reflection, especially when brightly illuminated from relatively close. And then there is also the dirt that accumulates on the hose during its regular usage. All this may result in images which appear "featureless" and dirty making it impossible to detect small cracks or other forms of damage. If in addition the hose is painted in colors going from black to white to pale red, which is the case in real life, then the above mentioned consequences will be intensified. A hose painted white, when illuminated will throw off a 'glare' preventing a clear view of the surface. If, to avoid this, a lower illumination is used the black zones will then appear too dark.

All the above mentioned makes it complicated to achieve a high enough quality to satisfy the established objectives. It makes us look for and create a solution that has never been included in any other patent before. It should also resolve the various problems that, as indicated, up till now have made it impossible to properly solve the manual inspection issue. The current inspection is expensive, delicate and the process itself can cause hose damage, plus numerous false negatives due to human error.

Currently there are no state-of-the-art systems with the technological know-how to perform in-flight inspections during extension or retraction of the hose whilst carrying out air-to-air refueling due to the complexity of the whole solution.

The air-to-air-refueling hose inspection process shows major technical difficulties for on-line inspection, because the hose moves during its extension and retraction as has been referred to previously.

There are reports describing attempts to inspect the outer surface of cylindrical parts such as cables or similar.

For example, patent EP0373796 shows the inspection of cables by means of cameras, but that method does not have to deal with the difficulty of moving the cable in order for the cable to be inspected.

Patent US20180057021 shows a structure that runs along a cable and it is equipped with wheels which adapt to the cable, so that the structure will follow the cable. However, in this case there is no issue with either horizontal and vertical movements, or pitch and yaw being transmitted to the camera bracket. At the same time in this example there is little or no variation in the diameter of the full cable.

Generally speaking, when inspecting elongated components that are subject to up and down movement, they are secured to retain oscillation on the same track where the cameras are mounted.

Therefore, the purpose of this invention is to improve the current techniques for inspection of elongated components, particularly concerning the in-flight inspection of air-to-air refueling hoses during retraction or extension. This way the expensive and complicated manual inspection on the ground can be avoided. Also, the developed system takes into account the various movements: giving consideration to the vertical and horizontal, and especially the hose's starting angle with particular focus on the pitch and yaw encountered and in addition possible sleeves or protuberances on the hose. This system will be described here and its essence is reflected in the first claim.

Definitions

For a better understanding of terminology used in the description of this invention, here are some definitions of terms of interest which will be used throughout this document:

Data Bus: A set of connections made of metal, glass, plastic or any other kind that provides internal or external transportation of data of the system.

Chiaroscuro: Although originally defined as a pictorial technique we refer to it as the effect created on an image by a camera, which is a result of the extreme contrast between very dark and very light areas. Cameras usually have a gain setting and its value is based on a simple calculation of the average light of a part of the image, which generally is a rectangle in the center of the image. For an image with a very light center the gain values will decrease, in consequence, affecting the brightness of darker areas. Vice versa for images with a dark center, only here the higher gain value will cause overexposure of light parts of the image.

Camera Axis: is the imaginary line perpendicular to and through the center of the image sensor plane.

Light Source Axis: is the straight line perpendicular to the output surface of the light source at the light source's central point of light emission.

Longitudinal Hose Axis: is the imaginary line that runs along the center of the cylinder that represents the hose.

The "photo" of the hose: This is an overall image of the full cylindrical surface, made up of its envelope that when unrolled and laid out flat forms a rectangle. In other words, the "photo" will form a rectangle that will have a width or base equal to the length of the hose and a height equal to the magnitude of the circumference of its maximum cross section.

fps: Number of Frames Per Second taken by the camera.

MCU: MCU is the acronym for Micro Controller Unit, which is a processor that can be programmed to receive a set of inputs and, as a function of this programming and depending on its various states, generate a series of outputs. This is a fundamental component of a control unit, however, the MCU can be replaced if other calculations or process requirements are needed. Substitutes can be a microprocessor (MPU, CPU), a FPGA (Field Programmable Gate Array), a GPU (Graphics Processing Unit) and other units with adequate processing capacity.

Pitch (P, FIG. 4): Pitch is the motion produced by the hose when its longitudinal axis changes inclination in the vertical plane containing this axis.

Yaw (R, FIG. 4): Yaw is the motion produced by the hose when its longitudinal axis moves laterally within the plane containing this axis.

Overexposure of part of an image: The values for the light that each pixel or one of the individual sensors, that an image sensor is composed of, receives through the lens, are multiplied by a fixed value called gain. When the gain value is very high as well as the number of photons reaching pixels, that can result in a value higher than that a pixel can handle. The sensor sets a limit for the maximum value or saturation, equal to a completely white pixel and providing little information about the content of the image. To prevent overexposed images the gain multiplied by the maximum light value of the pixel, needs to be lower than the saturation level. Overexposed images show complete white areas leaving out what's on the image.

Pod: In the realm of the air-to-air refueling, the Pod is known as the capsule or container that houses the hose and from which it extends or into which it retracts during refueling operations. Generally, tankers have one pod located under each wing for simultaneous refueling.

DESCRIPTION OF THE INVENTION

The objective of this invention is a device that obtains imagery of the full hose surface with an adequate image quality to enable remote hose inspection after acquiring the imagery and based on the information it contains. To achieve the objective this report describes a system that interactively moves the cameras and lights, this way maintaining a fixed position in relation to the hose's lateral, vertical and angular displacements. Furthermore, this patent refers to a method for imagery illumination and acquisition, applying the previously described assembly for the invention, so that the captured imagery throughout the retraction (or extension) of the hose shows surface details in such a way that it ensures without a doubt absence of damage on this surface.

Due to: 1.—The existence of an angle of the longitudinal hose axis in relation to the longitudinal Pod axis, 2.—That there are lateral and vertical transversal movements of the hose, 3.—The yawing motions in any lateral plane containing its longitudinal axis, allowing a myriad of positions, 4.—The longitudinal hose movement when rolling up on or off the drum, and considering that we want to obtain a set of images of the surface with similar characteristics, it is relevant for the cameras and lights to maintain a fixed position relative to the position of the hose at all time.

The system object of this invention must solve all those problems and make it possible, thanks to a number of moving components that can move in conjunction, to place or move the cameras and lights support structure through transverse repositioning such that it will maintain a fixed relative position in relation to the hose's varying lateral, vertical and angular positions and movements.

This invention provides an imagery illumination and acquisition procedure, based on the advantages of the system.

The system enables ground crew to analyze the hose surface from a "photo". The photo is of such (high) quality that surface damage can be ruled out if not shown on the image. As a result of this invention, the "photo" will be inspected by a single ground crew member who can go back and forth in the imagery and even zoom in on areas of concern. Thanks to the quality of the imagery the failure detection process can be fully automated by using intelligent software and this way simplifies the process, reducing the costs and minimizing errors up to nearly a 100 percent of the cases.

Based on all the above mentioned we can conclude that not only should the system meet the objectives as stated, but also comply to the following specific requirements:

1.—The "photo" of the hose should show the complete hose surface, meaning it must include the full hose length from one end to the other and its largest transverse perimeter.

2.—Illumination should not cause reflection, nor overexposure or underexposure, that make it not possible to detect damages.

3.—Imagery should not look grainy or blurry, despite the longitudinal moving of the hose or any other movement that could come up through vibrations, airflow, etc.

4.—The imagery captured by the cameras must not show any distortions due to the angle of vision on the hose surface nor by the curvature of the hose that fluctuates over a cylinder that moves away from the camera's optical axis. So that when combining all the imagery of adjacent cameras the "photo" must be consistent and without showing irregularities that could mistakenly be seen as damage to the hose.

5.—The captured imagery quality of all the separate cameras in place should enable them to be easily combined as one consistent and complete photo, using software to align the intersection lines between images, to adjust clarity, gamma factor, white balance and other parameters. Therefore, adequate guard zones need to be in place, as well as the capability to combine the imagery to create the stated "photo".

6.—Also, it is important to consider the fact that we are potentially dealing with hoses that are not new. Meaning, unlike other elements that are subject to inspection or detection, this one isn't consistent nor in a perfect condition or free of marks, deterioration and wear by use: on the contrary. That is why every detection will always be based on a photo with a complex composition of which at first glance a ground crew member will have to be able to identify even the tiniest damage with a visual inspection, as damage could lead to leakage or general malfunction during the fueling process. This requires continuity and quality conditions in the reconstruction process which cannot be obtained with the current systems. To this purpose, the system needs to be innovative when it comes to quality and precision, being able to efficiently perform this complex task at a guaranteed standard. This is not merely about rejecting a few units in a production process as form of quality control. We are facing a highly demanding task of a precision inspection that should prevent an accident from happening. The quality requirements are so high that that alone already differentiates this issue from the others. Not forgetting the system requires highly demanding environmental testing to get approved for use in aviation.

Considering this high level of requirements, a system arises that simultaneously resolves all the problems as stated and that represents the purpose of this invention.

The invention results in a system that will maintain the cameras and lights in the relevant position in relation to the hose, despite all its degrees of freedom and its inclination. The system can achieve this by means of a number of moving components that have been introduced into its structure, providing the toroid volume with cameras and lights a mobility equal to the hose movement. This way the structural segments on which lights and cameras are mounted will follow the hose movement, facilitating illumination and image capturing at any moment during extension and retraction. If not for the tracking and use of the cameras and lights in relation to the hose, necessary quality requirements for the captured imagery would have never been met.

When fully implemented the system will consist of the following elements:

An active electronic part or subsystem made up of:
A set of cameras.
A set of lights to illuminate the hose. Such a set of lights comprises generating elements in various angles and with different colors, including polarized light.
These previous elements will be installed on a sort of ring or toroid volume equidistant from the center of the hose axis.
A cameras and lights control system which determines the camera exposure time and illumination of the lights, combined with the connection to the aircraft to receive commands and to download the imagery, as well as a power supply and the wired connection between all the electronic parts. In essence, a light and camera sequencer controlled from the aircraft.
This control subsystem can be placed in a protective box or on the same ring that carries the cameras and lights, and it is connected to the aircraft, from which it obtains power and the appropriate operating commands for configuration, start-up, shutdown and data download. It is mainly composed of an electronic unit with enough processing capacity to efficiently control the operation of the lights and cameras as the hose moves.
The control subsystem (or the cameras as mentioned before), also has a large capacity memory that stores the images acquired by each camera per shot and a communications bus that allows you to download the stored information, which will form each part of the referred "photo" of the hose.

A mechanical supportive and protective structure for the previous mentioned components, setting them up in the right position in relation to each other and enabling tracking of the hose so that the captured imagery is of the best possible resolution and quality. This mechanical structure can be divided in the following parts:

A basic structure that can be fitted to a container, capsule or Pod consisting of:
Structural elements for fixation with fixing lugs at their ends to secure them to a Pod. Optionally, it can be considered to also fit two pairs of structural elements, which we call inclination brackets, mounted on the fastening structures that compensate for the initial inclination that the hose's longitudinal axis forms with respect to the longitudinal axis of the Pod, so that the toroid volume, on which cameras and lights are contained, remains as perpendicular as possible to the longitudinal axis of the hose.
Both horizontal and vertical slide bars, where the horizontal slide bars connect the upper and lower ends of the fastening structures while the vertical slide bars are mounted on the horizontal slide bars.
Optionally, low friction cylinders can be installed that will slide over the previous mentioned slide bars. They facilitate the horizontal and vertical movements of the system by its own thrust, because of the effortless movement of the hose. The purpose of the slide bars together with the low friction rings is the hose not having to exert excessive force to displace our system while in its natural movement unrolling from the drum. Thus, the system can use the hose itself to follow the horizontal and vertical movements of the hose, while the guidance substructures of the hose, which will be described further on, prevent it from breaking out of the barriers. All this to avoid overload of the actual hose which is the force behind the guidance substructures. The only force the hose needs to overcome is friction with those guidance bars and the forces that cannot be contained by the sliding elements (apart from the weight in case of the vertical bars).

A primary guidance-substructure surrounding the hose, which we refer to as fixed, which moves with the hose by sliding over the sliding bars thanks to the low friction cylinders, that are attached to this first guidance-substructure and that consists of:
A support structure for all the elements it is made up of.
Optionally, you can count on low friction sliding wheels that will surround the hose surface, enabling the hose to push and displace our system.
Axles or bars to carry the wheels and allow them to spin.
Optional are tangential guidance skates that enable the hose to pass even if there are any irregularities, including a hose sleeve especially for when the diameter of these elements is bigger than the hose itself.
A set of springs that attach the substructure to the previous mentioned skates and that cushion the shocks or "impacts" of the hose and/or its irregularities.

Optionally, a secondary substructure that surrounds the hose, that we refer to as floating, that moves with the hose and which like the first guidance-substructure is composed of:
A support substructure for all the elements it is made up of.
Optional are low friction sliding wheels that will surround the hose surface, enabling the hose to push and displace our system.
Axles or bars to carry the wheels and allow them to spin.
Optional are tangential transport skates that enable the hose to pass even if there are any irregularities, including a sleeve with a bigger diameter.
A set of springs that fasten the previous mentioned skates and that cushion the shocks or "impacts" of the hose and its irregularities.

As previous mentioned, a toroid volume to house cameras and lights.

In the most complete version of this invention, this toroid volume or ring will be attached to the floating guidance-substructure and in the basic version of the invention, it attaches to the fixed guidance substructure.

In the most complete version both substructures are interconnected by:
Extendable rods supported by ball joints at the ends that will enable the floating substructure to move with respect to the fixed one, thus placing the rods in parallel with the hose and the ring with cameras and lights perpendicular to the hose. The ring will track the hose movements regardless of its position and angle. When the hose pitches or yaws, the wheels suspended to the hanging substructure will follow the hose and allow the rods and the structure itself to tilt, so that the rods maintain parallel to the hose. This way the cameras and lights will always have the same position, distance and angle in relation to the hose, which will travel inside of the substructures and parallel to the rods.
Aiming for the substructures to adjust to the hose in the most reliable way possible, while there is no significant friction with our system, springs have been added to the wheels and skates which are attached to the substructure. The springs' objective is to force or strain the wheel to keep friction with the hose at all time.

The springs could have been substituted by axles, if the hose was to have a constant diameter, which is not the case. In addition, there's a coupling sleeve or protuberance on one of the ends of the hose that also needs to pass through the substructures. In other words, the wheels need to separate significantly when the coupling sleeve passes through both substructures. In order to prevent the coupling sleeve from literally hitting the wheels, it is essential that the axis of the wheels is above the obstacle that needs to be overcome. If otherwise, the wheel will hit the obstacle, which in this case is the coupling sleeve. The reasonable thing to do here to resolve this issue is to increase the diameter of the wheel. But in our case, this will not be possible, because if the wheel would come off the hoses surface due to the coupling sleeve, at one point it would hit the inside of Pod and cause unacceptable damage. The solution is the introduction of a skate that partially acts like a wheel, letting the coupling sleeve pass without a problem, as its rotation axis is on a much higher level than that of a wheel occupying the same space. The spring allows the skate to overcome the coupling sleeve and after return to its normal position as will the wheels. The fact that the skate is used as a wheel and it's made out of a self-lubricating material, such as Teflon, enables the coupling sleeve to easily pass in both directions.

Not many cameras are needed (minimum of three, preferably four). Without infringing on the quality system performance, it is possible to increase the number of cameras, in order to have redundancy and fail-safe (for the cameras).

But all the above mentioned is not enough for an optimal solution to the "photo" acquisition issue. There is one more important aspect: The system's hose illumination based on the ability to place it efficiently.

The composition and lay out of the lights in relation to the cameras and the way of illuminating the hose, provides the invented object of this document an undeniable advantage, which we consider to be one of the most important factors that also distinguishes this patent from other systems or methods that could be related to it.

We have discovered that even hoses with a very smooth and uniform polished surface which is caused by the friction during normal use contain a number of irregularities giving the hose surface a certain roughness. And however minimal in some areas, when appropriately illuminated it is enough to generate what we call a structure of "micro-shadows". These micro-shadows can be visible when illuminating at an angle of at least 45° with the perpendicular to the hose surface. Illuminating it in this way displays an unexpected but highly desirable collateral effect, which emerged during the development of certain mockups of the invention and it is one of its most important features. This is a micro-shadow effect that enhances the surface texture, amplifying in a very interesting way any defect that might exist on the hose surface. As stated, this effect can be achieved by illuminating with a certain angle in respect to the perpendicular of the hose surface while the camera points to the hose at a perpendicular angle. This way, any unevenness that the hose surface may contain, generates a pattern that will produce the visual sensation of a special texture over the hose surface. This special texture has a certain regularity except for when damage has been caused. That is why any irregularity of that stated texture is a clear indicator of a problem of damage to the surface of the hose. Essentially, a type of visual amplification is produced of any damage that the hose surface may contain. The system's configuration provides this emerging effect a high value for the objectives that are pursued, as the configuration exceptionally facilitates the detection that is intended with the device object of this invention.

Furthermore, the lights that we use to illuminate the hose surface with the indicated angle, can be composed of rays of various colors according to their angle of incidence. And by meeting this angular requirement the mentioned texture is generated. In addition, for even better visibility the light can be polarized and complemented using a polarizer for the camera lens, to avoid some residual reflections that might appear due to anomalies of the hose surface originated during its manufacturing process.

It is important to point out that normally between the camera's axes and plane orthogonal to the illumination axes, there are several different angles. By arranging the cameras and illumination at different angles to the perpendicular of the hose surface, not only do we maintain the former mentioned effect, but we will also avoid other reflections generated by the most polished areas of the hose. In the end, an optimal solution can be found in applying at least one group of lights sources or lights from which the axis is inclined with respect to the axis of the camera, that illuminates the hose from opposite sides and alternatively and consecutively in a way that is tangential to the area of the hose seen by the camera. This way avoiding the illumination of one side offsetting the other side (FIG. 11), resulting in disappearance of the formerly mentioned micro-shadows as well as the texture that allow us to easily detect damage.

To better explain how various forms of illumination could be compatible with the indicated required inclination, we take a look at FIG. 10: if the camera's axis is z, we need to illuminate the hose in directions that will not generate reflections and which at the same time will illuminate its surface in the most tangential way, meaning, with an angle greater than 45° with the orthogonal to the hose surface. To achieve this, from a practical point of view we have two choices: from direction $\beta=0$ or $\beta=90°$ (or a combination of both).

Due to our system's geometric structure, we cannot achieve the pursued angle value to illuminate with $\beta=0$, as we would require to move the lights away an infinite distance from the cameras. However, we can move the lights in that direction $\beta=0$, a distance greater than the distance between the camera and the hose, so that the angle of incidence between the rays of light and the camera axis would be greater than 45°, thus we would meet the objective adequately.

Another option this structure provides us (see FIG. 10) is placing the camera at $\beta=90°$, meaning in a perpendicular plane in relation to the hose's longitudinal axis. The inconvenience here is that the hose, due to its circular cross section, has a varying angle of the perpendicular to its surface. To obtain the objective where the light-rays will be as tangent as possible in relation to the hose surface, we must consider that we only need the camera to see an angle of the hose of about 100°. Then placing lights on every side of the hose to illuminate its surface from opposite sides is sufficient. These light sources will need to be very directional. This way, we can illuminate the area of interest at again an angle greater than 45° from both sides. This second way of illumination is not as good as the previous one, but it is more viable considering the geometry of our system. To maintain the illumination in an angle greater than or equal to 45° with the orthogonal to the hose, we have introduced, as said, two points of light as a minimum, on every side of the hose (see FIG. 11).

Thus, we have two illumination methods that meet the established requirement and that will enable to highlight any damage on the hose surface. In our preferred implementation the second method has been used because of design simplicity reasons.

Also, the illumination can be improved adding a polarization to the illuminating light-sources. This results in the disappearance of certain reflections due to rays of light that reflect in areas with an inadequate angle. The camera's lens should also contain a polarizing effect.

We also benefit from illuminating with different colors depending on the inclination of the light rays. This will allow us initially to better visualize every irregularity of the hose surface and additionally, when placing a multispectral filter in front of the cameras' sensor, it would show hose surface damage that would reflect differently from the rest of the area.

With the described solution the objective of this invention, can be achieved through positioning of the lights and cameras in a constant position relative to the hose to be inspected, as well as a substantial improvement in the illumination and quality of the image taken of its surface, enabling an easier and more evident way for damage detection. These aspects combined provide us an overview of the full hose surface with the clarity, detail and high-quality resolution, giving more than enough features to achieve the desired objective.

The lights are arranged in a way to enable them to illuminate the surface of the hose to be inspected. There will be a number of specific lights assigned to each camera (although these will not be placed directly adjacent to the camera), meaning, when a camera is capturing a frame a specific number of lights, the ones assigned to this camera, will simultaneously and synchronous with it illuminate the area of interest to be captured by this particular camera. This functionality belongs to the sequencer that is located in the controller which is part of the system.

In the end a puzzle made-up of frames of the unrolled hose surface is formed, which needs adjustment at the frame intersections, or guard zones, in order to obtain a homogeneous and continuous "photo".

Inspection Procedure

There are two previous aspects that need to be considered within the inspection procedure, that have to do with the way we are going to capture the images through the cameras and with how we will combine or merge the imagery to obtain the "photo".

1.—The order of merging the imagery of the cameras: First the images of the cameras are acquired and thereafter merged with imagery of the same camera (in longitudinal direction) and the images of the adjacent cameras (transversal direction). The order of merging depends on the software being used and on its suitability for a certain order, regarding the task that needs to be performed on the imagery to combine them. Either we can first merge imagery of adjacent cameras to obtain imagery of a peripheral ring of the hose surface and next merge those rings longitudinally to acquire the "photo", or we can merge the imagery of each camera longitudinally to obtain strips of the "photo" which we will then merge transversely to get the final "photo".

Before carrying out the acquisition process in-flight, it is necessary to perform camera calibration as well as to adjust adjacent cameras in order to facilitate their fusion. The intrinsic parameters of each camera need to be obtained to reduce distortion due to lens and sensor artifacts. These parameters can be set during the production process and saved to the camera's memory. Also, during the production process, scale and gain parameters must be set and saved to improve the merging of imagery afterwards.

2.—To simplify and to save time obtaining and composing the imagery, we will group the cameras in sets in which the required lights will not interfere with each other. To illuminate and to take the imagery of every ring, firstly we will divide its surface in areas that correspond to different cameras and for which the illumination does not interfere with the ones assigned to other areas of other cameras. We group and illuminate the areas for those cameras which don't interfere with each other, to simultaneously acquire imagery with all the cameras in this set. This way, the sample rate corresponding to every ring is only divided into as many parts as there are grouped sets of cameras, into which the total number of cameras have been divided. Since we cannot sample all camera sets simultaneously, this means that the images taken by the different sets, when joined, will not match as they will be out of phase in time. That time difference is taken into account when merging a full ring.

Once the processing method for acquiring the image-cylinder of the entire hose has been chosen, this cylinder must be cut along a plane parallel to and including the longitudinal hose axis. In other words, the cylinder will be cut by one of its generatrixes to obtain a shape of a rectangle, which will constitute the desired "photo" of the hose. Accordingly, the upper side of the "photo" will coincide with its lower part.

Let's consider the retracting or extending hose to have a linear velocity of V mm/s and that the lens and the distance of the cameras to the hose are such that the length of the longitudinal fragment that these cameras acquire in each frame is $\lambda$ millimeters, corresponding to $r_h$ pixels which is the resolution of the camera's image sensor in the same longitudinal direction as the hose. This means that each millimeter on the hose's surface corresponds to $$\frac{r_h}{\lambda}$$

pixels for the camera. We need to calculate this for the part of the hose that is closest to the camera, which is the worst case.

To keep the hose movement from affecting the sharpness of the imagery captured by the camera, we will prevent the hose from moving during the exposure time $t_e$, about one order of magnitude less than the distance between two pixels. According to this:

$$t_e = \frac{\lambda}{r_h \cdot 10 \cdot V}$$

The minimum number of frames per second (fps) to be captured by each camera, so that there is at least a 10% of guard area of the image (allowing an overlap of 5% on each side), will be:

$$f \cdot p \cdot s \cdot = \frac{V \cdot 1,1}{\lambda}$$

If the length of the hose in millimeters is L, the recording frame rate will be:

$$T = \frac{L}{V}$$

And the number of frames captured by each camera:

$$N = f.p.s. \cdot T$$

The inspection procedure will be as follows:
Complete in-flight extension (or retraction) of the hose.
Start of the full in-flight retraction (or extension) of the hose.
At the same time the operation of the previous step begins and for every set of cameras in which we have divided all the cameras, according to the previous criterion that the lights do not interfere with each other, we switch-on the lights of the first set in sync with the recording of the frames by each camera of the set. This image capturing process will be repeated for every set of cameras.
We will repeat the previous process for each hose section, what we call hose ring, and which is a cylinder that reflects the all-around external image of a length of the hose. This process is realized at a frequency of f.p.s.
It is important for the lights that correspond to each camera to maintain the adequate angle with that camera's axis, as explained before, in order to achieve the required effect. The duration of the lights-on time of the relevant lights, will be of several microseconds. The capture time of each camera will be a few microseconds up to a few tens of microseconds, all depending on the image sensor sensitivity and the light intensity as well as the time the lights are on. As indicated, the frames captured by the different camera sets for a given image ring, will have a time difference in the sense of not corresponding to the same instance of time. For adequate image fusion, adjustment is required for intensity, gamma, white balance and also other adjustment operations on the sides of the image that lay adjacent to other photos.
The cameras image is saved to the memory. This image can be compressed using the compression standard H.265 (or similar like 264 or 266) to minimize its size, providing that the compression does not degrade the image too much.
When the hose retraction is completed, the controller will indicate this and will switch-off the lights as well as terminate image capturing by the cameras.
The system stops, waiting for the command to download the data from the memory for its afterwards processing and composing of the "photo".
Once the "photo" is obtained, a ground crew member can analyze it bit by bit on a screen and will be able to check if any part of the hose is damaged.
It should be considered that the system and the procedure can be redundant, meaning, a second assembly of cameras and lights are placed between the previous ones with a gap between consecutive cameras. For example, in case of four additional cameras, this would be 45°. This way, a second set of images would be captured, ensuring an accurate capture of the hose surface with either of the two mutually redundant subsystems, with the advantage that in case one or more cameras of a subsystem fail we continue having enough information for the "photo".

Also, we can polarize the light coming from the light sources and we can place a polarizing filter in front of the cameras lenses as well. This ensures us the light ray directions and the filtering of unwanted ones, improving avoidance of reflections and glares.

Likewise, we can use colored lights from various directions, so that elements or parts of the hose surface that will pop out the normal disposition show a different color, making it easier to highlight any irregularity of the hose.

As indicated both the cameras and the processing unit can include compression capability for the imagery coming from the cameras in order to reduce the amount information needed to recompose the "photo" of the hose surface.

The system shall comprise a program to compose the "photo" of the hose surface, as soon as the imagery is captured by the cameras.

The system can also contain a program that analyzes the "photo" of the hose surface and detect critical areas of damage that might exist on the hose surface.

To avoid electrical current spikes coming from the aircraft generator the system can include a set of super-capacitors that continuously store energy which is provided to the illumination when needed.

By using the system as proposed, a high efficiency is achieved as the imagery is captured during the in-flight retraction and/or extension of the hose. No specialized personnel is required to intervene, and the hose cannot be damaged during the process as it is performed in the air. After downloading and composing, only a visual inspection on a screen by a ground crew member is needed. The final process is more economical, safer and simpler. In addition, the achieved result enables further digital processing to automate this inspection.

Unless otherwise indicated, all technical and scientific elements used in this report, have a significance that is commonly understood by an expert skilled in the métier of this invention. In the practice of the current invention, it is possible to use procedures and materials that are similar or equivalent to those described in this report.

Throughout the description and the claims, the expressions "comprise" or "is made up of" and their variants do not pretend to exclude other technical characteristics, additives, components or steps. For subject-matter experts, other purposes, advantages and characteristics of the invention will come off, partly from the description and partly from the employment of the invention.

EXPLANATION OF THE FIGURES

To complement the description that is given herein and with the purpose of helping a better understanding of the characteristics of the invention, as an integral part of that description and according to a preferred example of the practical realization of the invention, the following is represented in a set of drawings, by way of illustrative and non-limitative character:

FIG. 1 shows us a schematic representation of the cross-section of a drum where the hose rolls up to or rolls off from.

FIG. 15 to the right shows the two positions of the wheels and coupling sleeve when respectively the hose and the coupling sleeve pass through the substructure.

At the end of the description of the invention's preferred implementation, a list is added to this document with the names of the elements shown in the figures in order to allow better search and locate each of them.

PREFERRED IMPLEMENTATION OF THE INVENTION

With respect to the figures, a preferred implementation method of the proposed invention is described below. Without imposing limitations, it aims to explain the realization of a specific implementation and its functionality of it, with the main purpose to illustrate more in detail the properties that define this invention.

Figure 1:
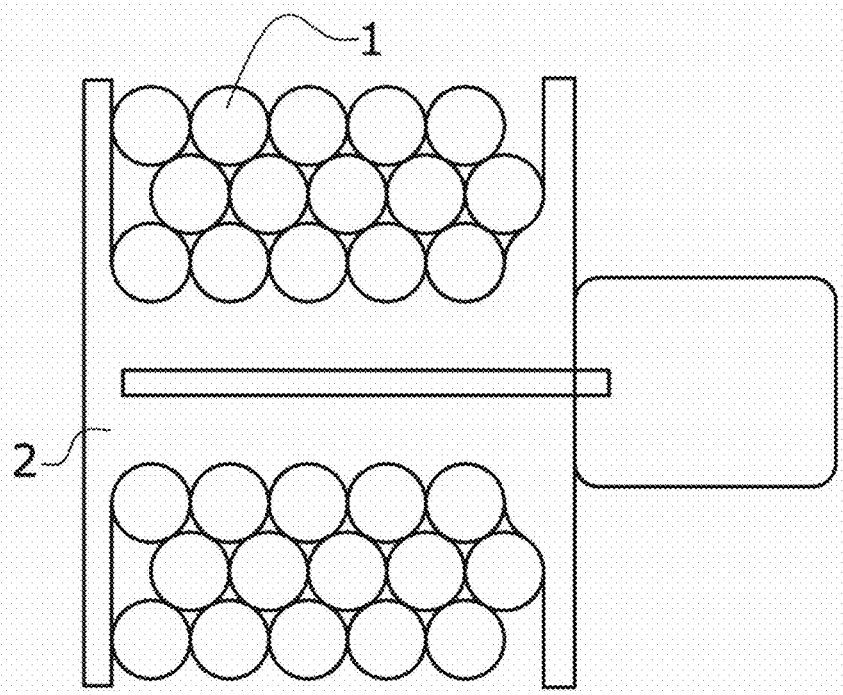

FIG. 1 shows a drum (2) where the hose (1) rolls onto or rolls off from. This drum is located inside a container or capsule which houses the hose (1) and which we from now on will call Pod, that generally is placed under the wing of an aircraft. An aircraft with this configuration can be named "tanker" and it can supply fuel to other aircraft by the hose and drogue method.

Figure 2:
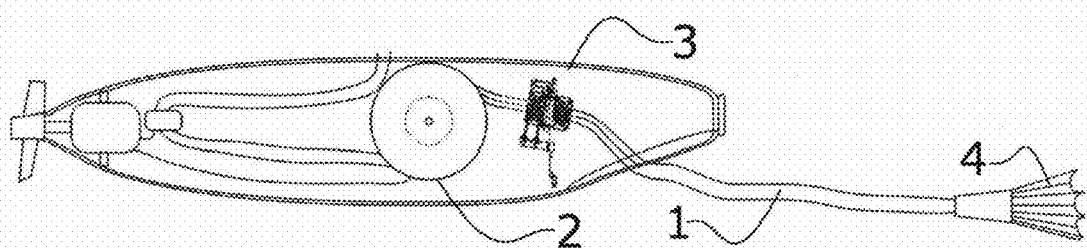
FIG. 2 shows us a cross-section of a "Pod" (3) with its most essential elements functioning within. The drum or the reel (2) where the hose rolls up to (1) and the drogue (4) at the end of the hose (1).

FIG. 2 shows the inside of a Pod (3), in which we have placed the system object of this invention and through which the hose passes. We pursue the rolling-off and rolling-up movement of the hose (1) in-flight, to simultaneously to this process have the system acquire the information on the hose surface.

Figure 3:
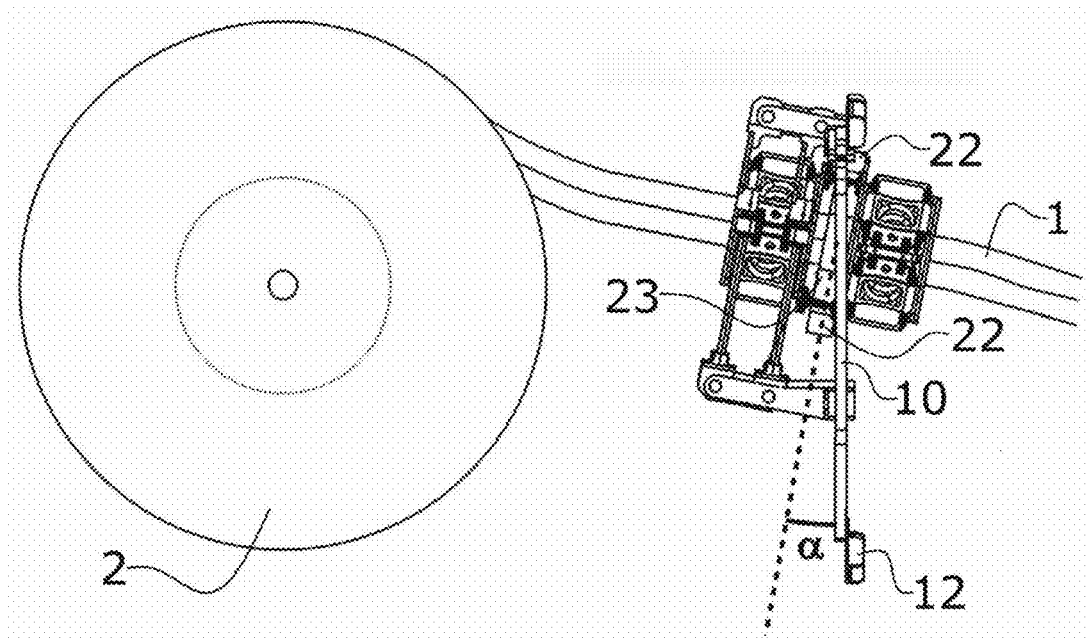
FIG. 3 shows us on a larger scale a front and elevation view of the drum (2) and of the position structure of our system and imagery acquisition which is mounted inside the Pod (3).

The system the object of the invention, as shown in FIG. 3, is secured on the inside of the Pod (3) using lugs (12) which are fastened to a fixation structure (10), through which the hose (1) will pass in its full length.

The system consists of a set of cameras (22) and lights (23) placed on a ring around the hose. The system's purpose is to achieve a very high quality in captured imagery of the hose (1) and a high level of consistency regarding the generated imagery and the degree of illumination that each camera receives. Therefore, for the purpose above, a main objective of the system is to always maintain those cameras (22) and lights (23) at the same distance to the hose.

Figure 4:
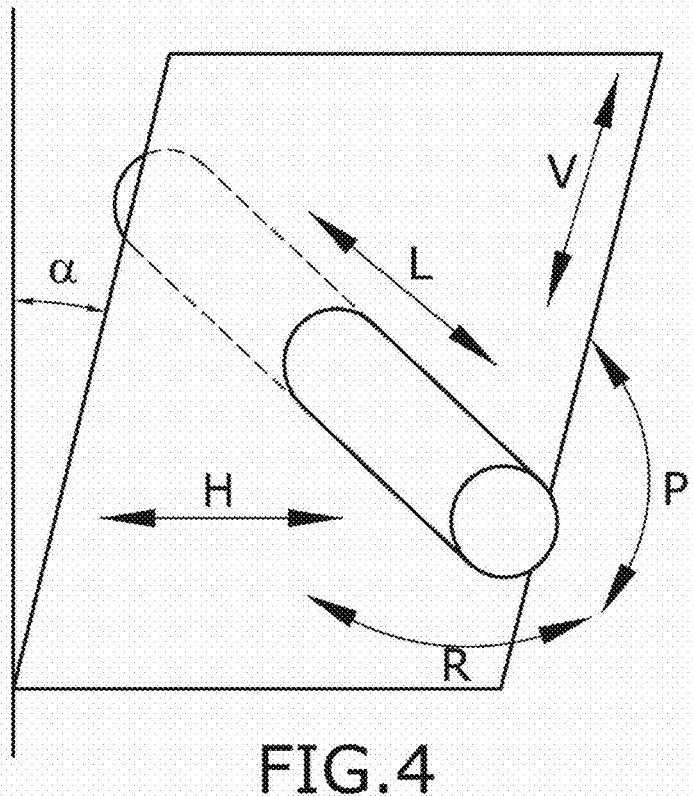
FIG. 4 shows a schematic representation of the inclination (a) and the different types of movement or degrees of freedom of the hose, which cause the system's complexity to obtain a constant relative position with respect to the hose.
Figure 9:
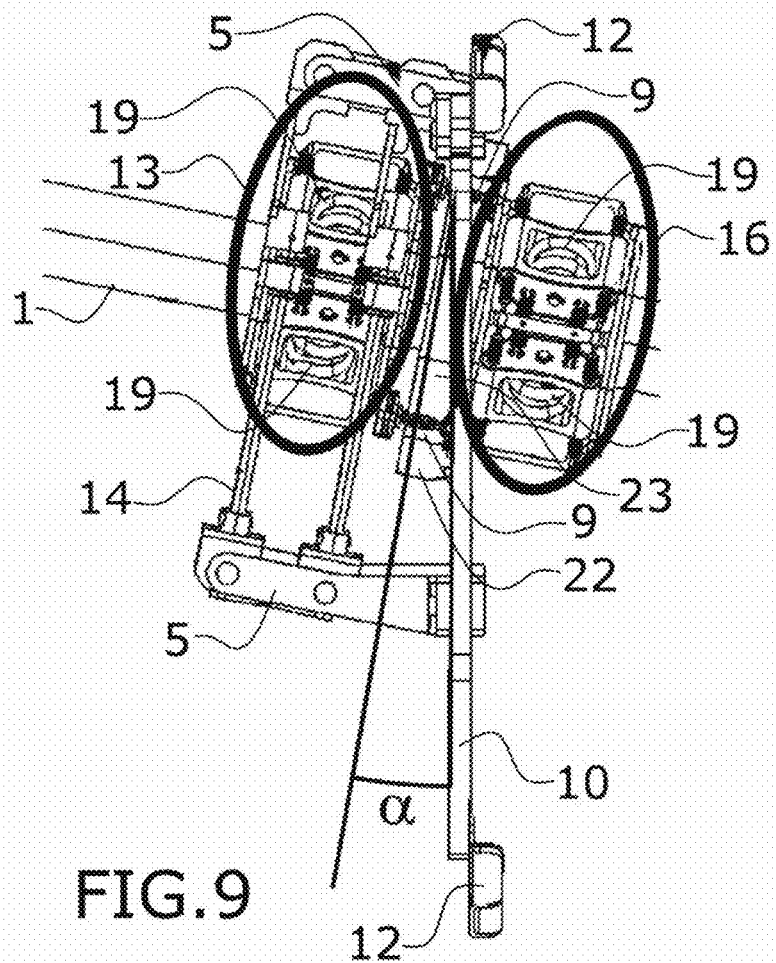
FIG. 9 highlights within the two ellipses the guidance-substructures of the system, a fixed primary guidance-substructure (13) on the left and a suspended secondary guidance-substructure on the right. Both enable the ring of cameras and lights to stay perpendicular to the hose.
Figure 10:
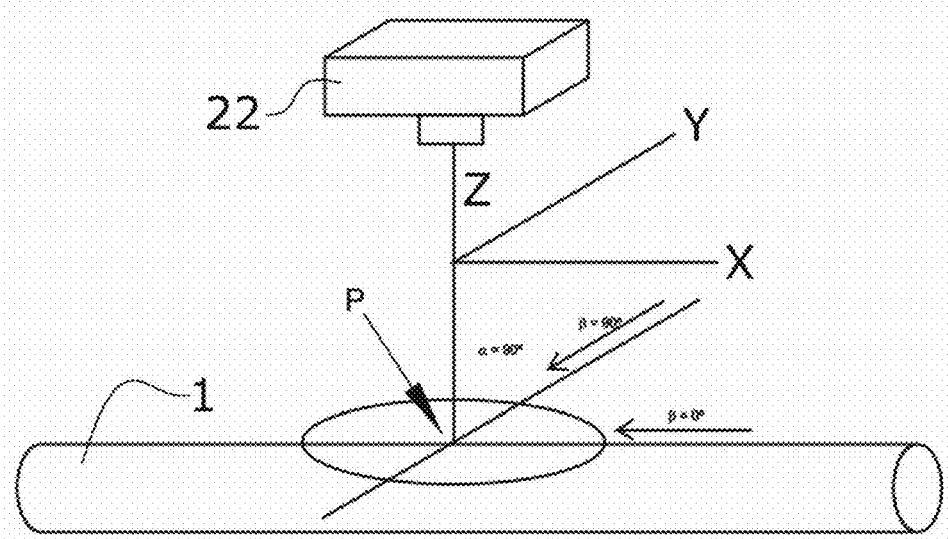
FIG. 10 shows a Cartesian schematic of the hose (1) and the different relative directions of the cameras and illumination.

Due to the hose rolling on to (or off) the drum inside the pod, an inclination angle ($\alpha$) appears in relation to the orthogonal plane to the hose (1) axis, as a consequence of its angle when rolling on to (or off) that drum (2), (see a in FIGS. 3, 4, and 9).

On top of that, the position of the hose (1) will be moving both in horizontal direction (H) (enabling several rounds on the drum) and in vertical direction (V) (enabling several levels on the drum, with different winding radii on the drum). This is how the previous facts are indicated in the FIGS. 3, 4 and 9 with the angle ($\alpha$) and in FIG. 4 with the arrows (H) and (V). In other words, we are dealing with a fixed inclination angle and two different movements of the hose (1) in relation to the Pod (3), which we consider as our fixed reference.

Also, and as a consequence of firstly the exterior aerodynamics and the maneuvers of the tanker and secondly the different rotation angle of the hose on the drum, the drogue (4) can produce a drag force pulling the hose in different directions (1) and change its direction with respect to rolling off the drum. This change of the direction of the drogue's (4) movement can be vertical or pitch (P) or horizontal or yaw (R) as indicated in FIG. 4. Therefore, we have two additional movements or degrees of freedom.

In short, as above mentioned, we have a fixed initial angle (a) and five degrees of freedom corresponding to the four previous ones (H), (V), (P), (R), together combined with the longitudinal movement (L) of the hose during its extension/retraction process and also the changing hose diameter due to the coupling sleeve that needs to pass through the system.

Figure 8:
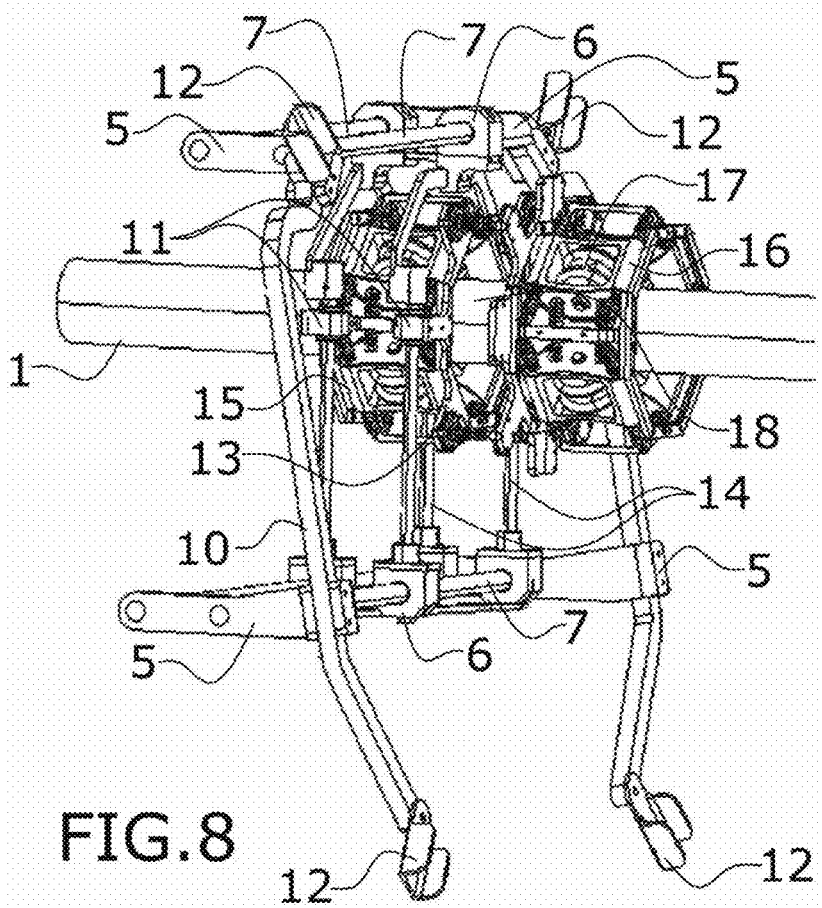
FIG. 8 shows the system object of this invention in a lateral perspective.

As stated, the objective of our system to preserve a high degree of quality in the captured imagery, is to maintain the cameras (22) and lights (23) in a fixed relative position in relation to the hose. That is why the system object of this invention will compensate all the previous movements and inclination and it will do so as follows:

To compensate the fixed inclination a due to unrolling off the drum, the system consists of two pairs of arms (5) of different lengths that give that inclination to the rest of the system (FIGS. 8 and 9).

Figure 14:
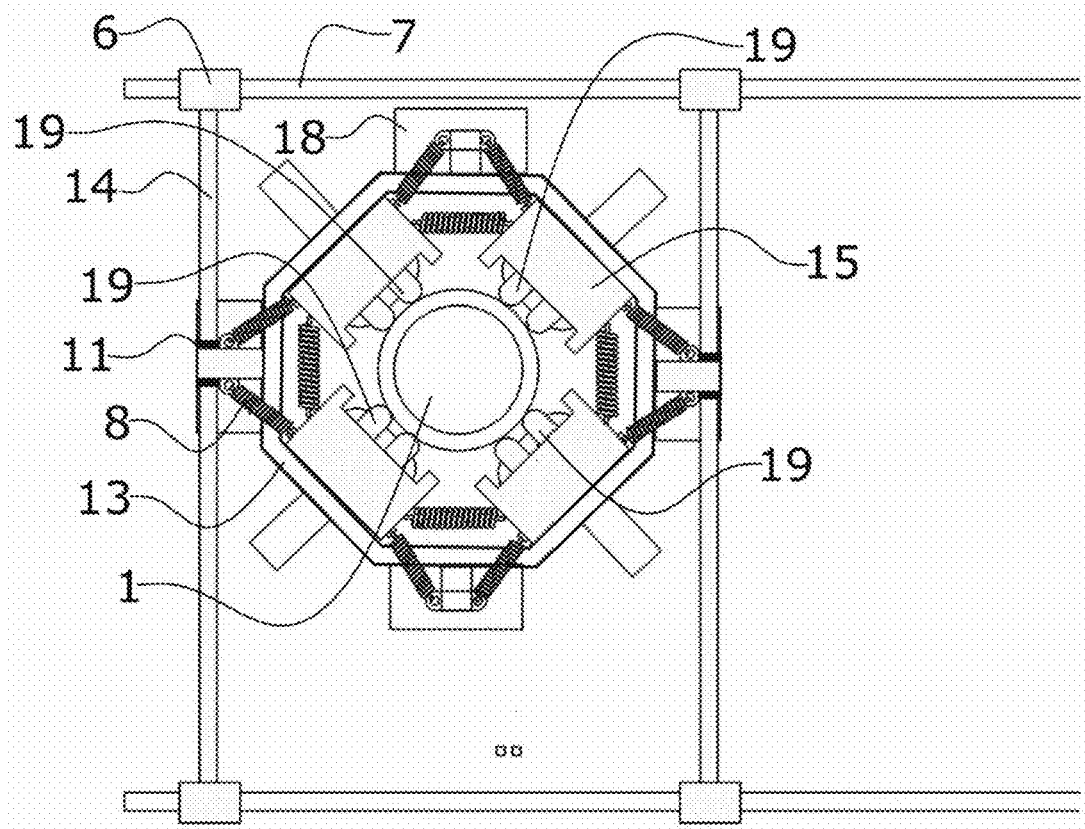
FIG. 14 shows us a cross-section of the hose (1) including the elements which are part of a guidance substructure.

To compensate the horizontal (H) and vertical (V) movements, the system comprises a primary guidance-substructure (13), octagonal shaped (see FIG. 9) in this preferred implementation, in which four wheels (19) have been placed, with a 90° difference with respect to the next wheel, all with their axles (20) (FIG. 7) perpendicular to the hose axis. It is the wheels' mission to 'roll' over the hose surface (1) in order for the substructure to follow the hose's movement. The springs supporting the wheels tend to place them in the center of the substructure to make it follow the hose's position. FIG. 14 shows a cross-section, where four wheels (19), corresponding to this preferred implementation, roll over the hose (1) making the spring-wheel assembly embrace it and the substructure follow the hose.

Figure 15:
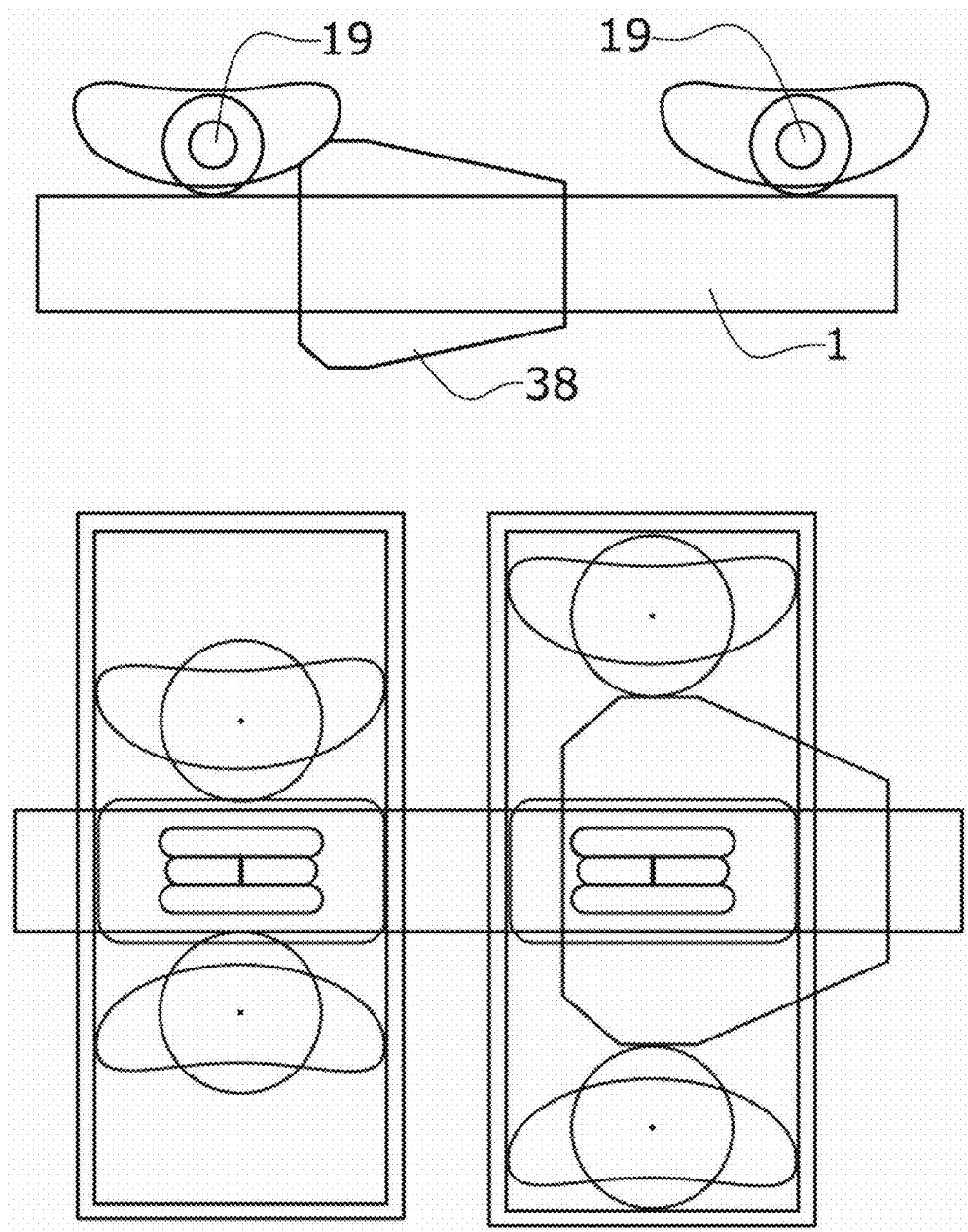
FIG. 15 shows an elevation view of a longitudinal section of the hose (1), displaying the coupling sleeve (38) and two positions of the skates and skate-wheels (19) on the left.

This primary guidance-substructure (13) aims for the hose to pass on the inside of the structure with as little friction as possible, hence the wheels (19). But also, as the hose moves horizontally (H) and vertically (V) it intends to move this substructure evenly with the hose itself. As mentioned, to attach this substructure as close as possible to the hose (1) some springs (8) have been added. And considering that the hose's diameter may vary, as in our case due to the existence of a coupling sleeve, increasing it considerably, skates (15) have been introduced. These functionally increase the wheels' radius and they generate the same result as the wheels of following the hose in case of an increased diameter of the hose. The skates (15) functionality is very similar to the one of the wheels (19) and although the skates cannot roll like the wheels, however they rotate to allow a bulge or sleeve (protuberance) (38) in the hose pass through the substructure. If we would not place these "skates" (15) and to prevent a bulge (38) in the hose blocking the wheel (19), then we would have to increase the diameter of the wheel. This is not possible in our case because when these wheels move away from the substructure's center due to a wider part of the hose, their large diameter would cause the wheels to hit the interior of the Pod (3) resulting in a non-viable implementation of the system. This does not occur with the skates (15) as illustrated on the right-side image of FIG. 15. The left side of the same figure shows how the skate overcomes the obstacle of the coupling sleeve (38) and how, if not placing the skates (15), the coupling sleeve (38) that has a height when hitting against the wheel close to its radius, would cause the wheel to block and probably damage one of the elements of the system. FIG. 15, to the right, shows the two extreme positions the skates will be in. The first position corresponds to the passing of the hose and the second to passing of the coupling sleeve (38).

The skates (15, 17) must be made of a smooth and polished material, that may not get stuck to the coupling sleeve (38). Teflon could be useful as it is auto lubricant or other similar material that is suitable for the required temperature ranges.

Figure 7:
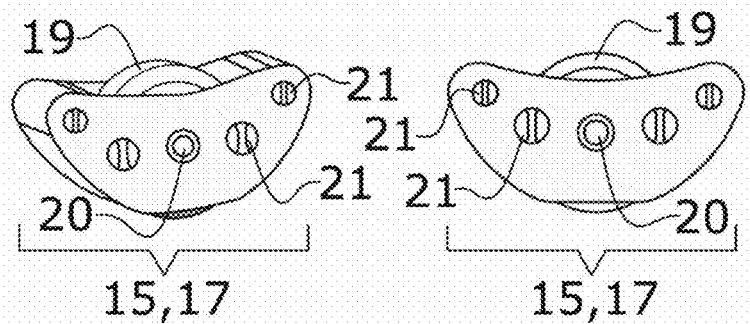
FIG. 7 represents elevation and perspective views of the system's skates (15, 17).

Obviously, each skate (15) has its own axle (20) as well as its corresponding wheel and it features hitches (21) for each of the springs (8) (FIGS. 7 and 14).

Figure 6:
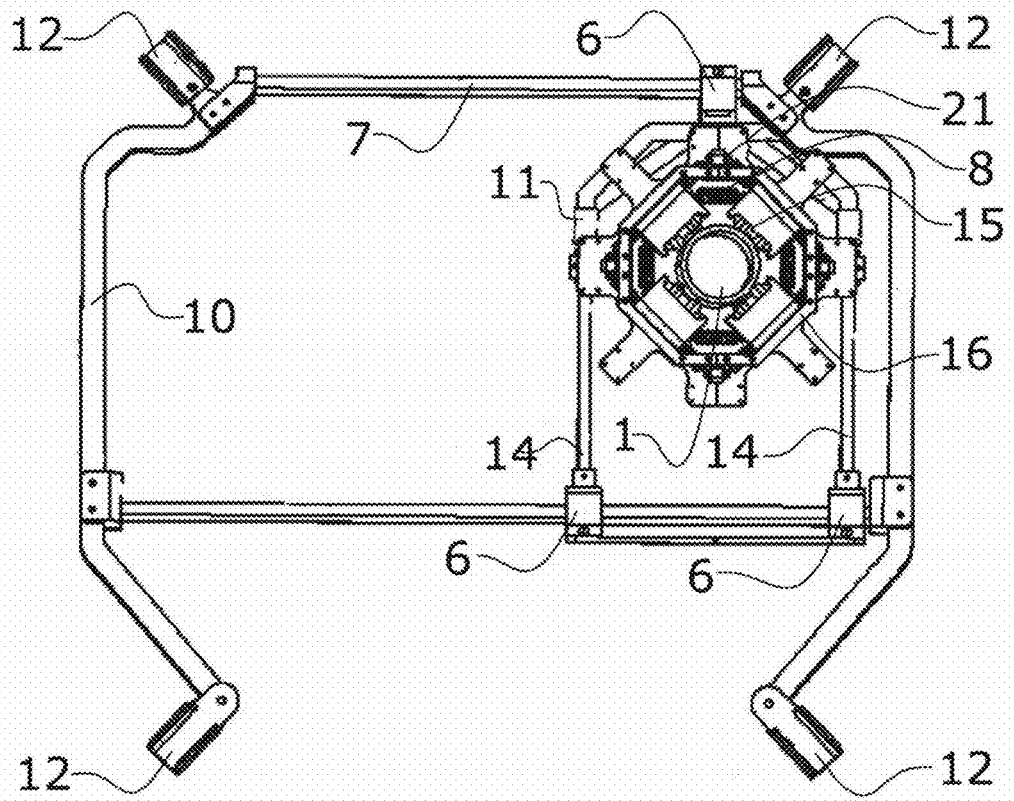
FIG. 6 shows the structure object of this invention from a frontal view.

For this primary guidance-substructure (13) to move horizontally and vertically (FIGS. 6, 9 and 14), our system's structure has been provided with both horizontal (7) and vertical (14) bars, that combined with low-friction cylinders (6) (11) placed on the guidance-substructure, will allow the substructure to move in those two directions H and V with minimum effort from the hose.

Thanks to this primary guidance-substructure (13) the horizontal (H) and vertical (V) movements are compensated and when placing the ring (18) of cameras (22) and lights (23), attached to this substructure, those movements would no longer affect them (in terms of maintaining their fixed relative position in relation to the hose), as the guidance will make the substructure follow the movements of the hose.

But in order to obtain an even better image quality, the movement of the drogue (4) has been considered as it changes the hose's direction when rolling off the drum (2), as well as the changing diameter of the retracting hose due to its increased number of turns on the drum (2). To compensate for the two changes/alterations (P) and (R) these movements generate, (see FIG. 9) a secondary guidance-substructure (16) has been implemented, also with wheels (19) very similar to the primary guidance-substructure (13), and the secondary will also follow the hose (1), but as it is suspended to the primary guidance-substructure (13) (that we have referred to as fixed) it will have substructures joining-rods to join them, in the same direction as the hose (1) compensating/offsetting those deviations as intended. The ring (18) with the cameras (22) and lights (23) will be attached to the joining-rod (9) between the two substructures in this most complete implementation of this invention.

Figure 13:
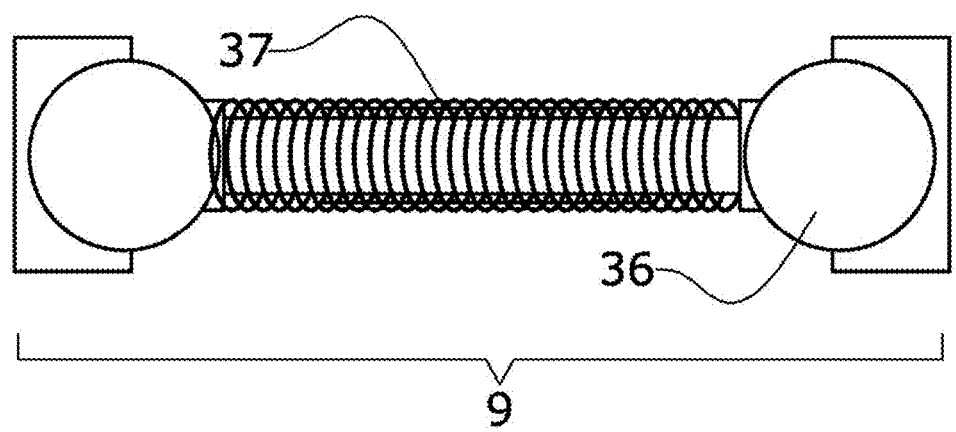
FIG. 13 shows schematically how a connecting rod would be implemented between the guidance-substructures.

As mentioned, to join the primary guidance-substructure (13) and the secondary guidance-substructure (16) and to allow for the secondary guidance-substructure (16) to move in respect to the primary guidance-substructure (13), some fixing elements have been introduced. In this configuration there are four of them and we call them substructures joining-rod. They are composed of an extensible element such as a spring (37) attaching each one of them to a ball joint (36) fixed to both substructures (see FIG. 13).

This way the pitch and yaw movements of the hose are compensated with the suspended guidance-substructure (16) and at all times, the cameras (22) and lights (23) will move synchronously to the hose (1) itself also compensating those movements.

Thus, we have two potential implementations of this invention, the first implementation with only the primary guidance-substructure (13) or fixed guidance-substructure. The second implementation, adding the secondary guidance-substructure (16) or suspended guidance-substructure (13), more complete than the primary contemplating the compensation of these additional two movements (P and R) of the hose.

We must also consider the hose's own movement along its longitudinal axis (FIG. 4) (L). To compensate this movement, what the system does is with each camera take frames at a very high frame rate, so that during the time frame this is produced, the movement of the hose is negligible. We are talking about a few microseconds. To capture quality imagery during that short time frame, we need high intensity lights (23) which our system comprises of.

Figure 12:
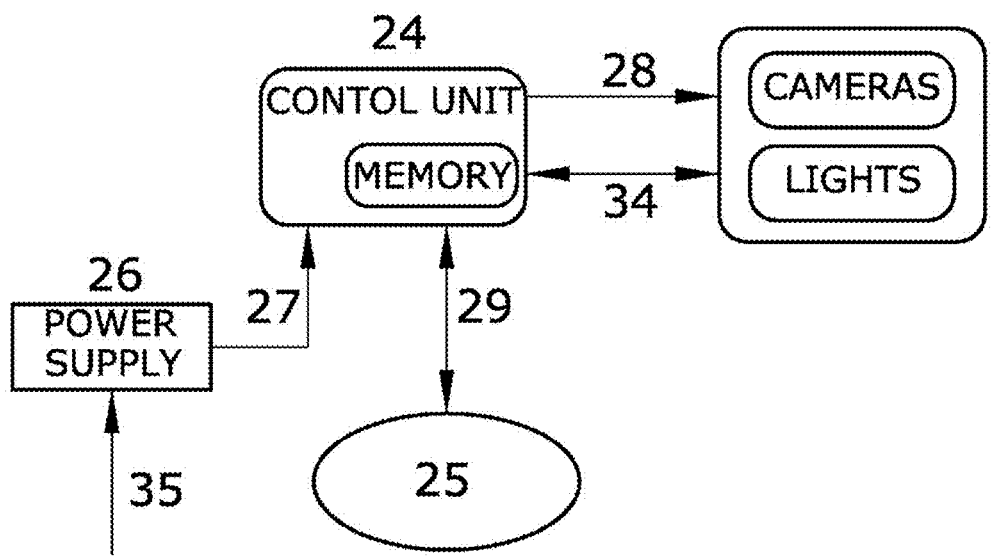
FIG. 12 shows a diagram of the invention's electronic system and of the connections regarding signals and power supply (35) from the aircraft.

In addition, the system (see FIG. 12) comprises a control unit (24), in our case made up of a microcontroller (MCU) and peripheral components, programmed to send a power-up command through a control bus (34) to the lights (23) and cameras (22) so that imagery of the hose (1) will be acquired along its full length and depending on the speed of its retraction (or extension). The control unit (24) is powered through a power-adapter or -converter (26) from the aircraft (35), with this control unit (24) connected to the adapter or converter (26) through a primary connection (27), while the cameras (22) and lights (23) receive power supply from the control unit (24) through a secondary connection (28). The control unit (24) will also have a memory that will store the information of the acquired frames and will send them promptly to the download point (25) through a high-speed bus (29).

Figure 5:
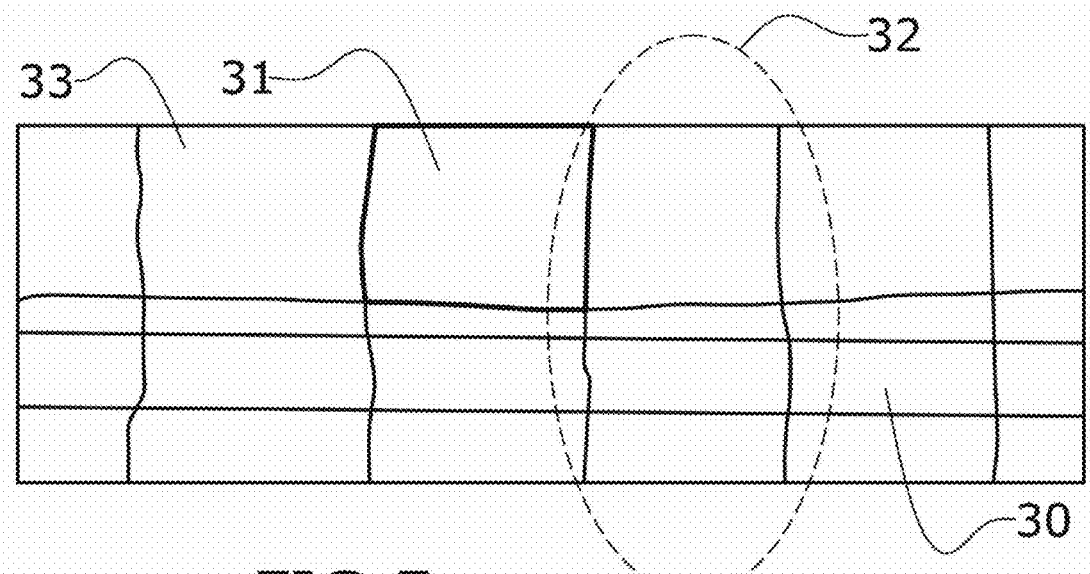
FIG. 5 shows the hose divided in frames (31) that will have to be combined both transversal as well as longitudinal to obtain the "photo" of the hose.

The hose (1) is photographed by the cameras (22) to obtain the frames (31) (FIG. 5), that with the adequate all-around guard zones allow to compose them for each instant of time and generate a ring (32). These rings have as many frames as there are cameras. On every frame the redundancies of the guard zones are eliminated, and they are combined with the adjacent frames to form a complete image of the hose (1) perimeter for any given time segment. In the configuration as shown (FIG. 6, 14), there are four cameras and frames. They are sampled at sufficient frame rate to allow for some buffer zones on the longitudinal axis between them. These buffer zones, again, are nothing more than the repetition of part of the hose image at the end of one ring and the beginning of the next and allowing to ensure the continuity of the photo. To create the composition of all the rings of the hose, these new guard zones are eliminated, and the "photo" is generated with a very high-quality level thanks to the system's architecture.

To obtain the photo, additionally it is important (see FIG. 5) to consider that the hose surface is painted on, with rings and longitudinal lines (30) and so various colors like white (31) or black (33) or red. In order to prevent these very different colors, due to the reflection of light received from the illumination, to overexpose or underexpose the frames, it is important to determine the adequate level of illumination, that thanks to this design will remain constant throughout the operation. In addition, reflections have to be avoided to achieve the micro-shadows effect as previously explained.

Figure 11:
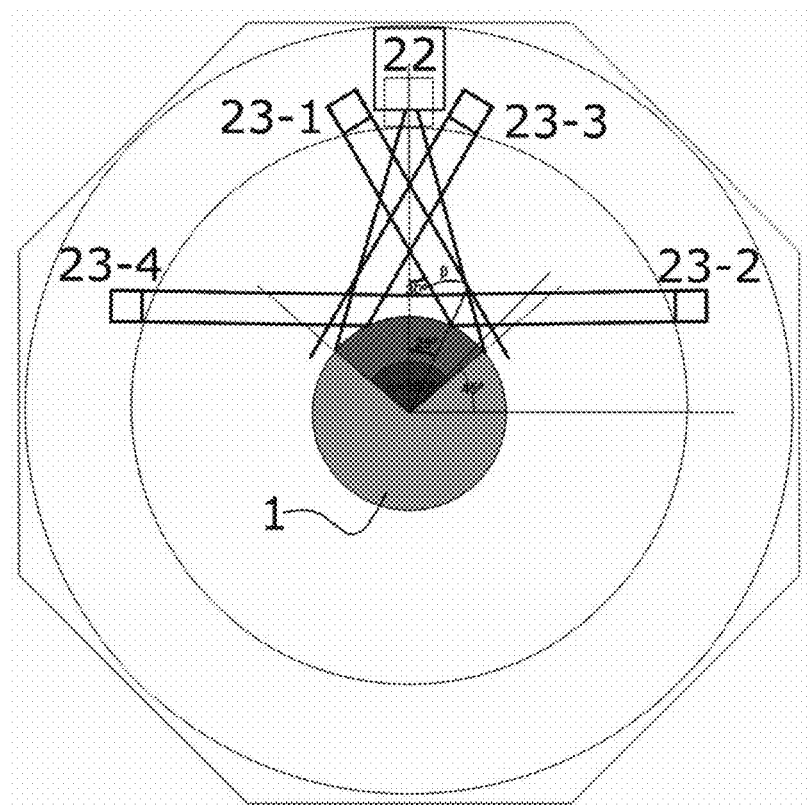
FIG. 11 shows 4 sets of lights (23) used to illuminate the area of interest of the hose (1) for one specific camera (22).
Figure 11:
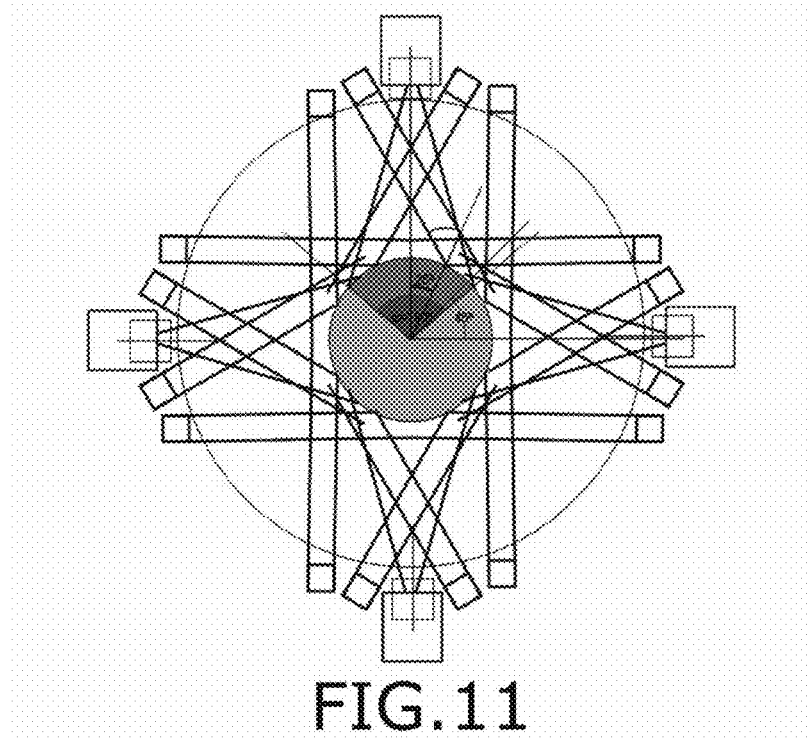

In our preferred implementation, the lights will be arranged in a hybrid way to the ones mentioned above (In the DESCRIPTION OF THE INVENTION section). That is because the closer we get to the first method, the more the lights can be elevated and the better the obtained angle will be, always more than to 45°. We can move the lights a little away from the cameras on the hose's axis, so that this will allow us to elevate them a bit and more easily meet the required angle above 45°. We can see the preferred arrangement of cameras and lights on FIG. 11. Although this view doesn't reflect that mentioned displacement, it shows how the hose surface which needs to be framed is illuminated for the top camera by four lights from opposing sides and angles. The rays of light form an angle above 45° with any orthogonal to the hose surface for the whole area which that light intends to illuminate. It is also important for the lights not to interfere with each other, as this could eliminate the micro-shadows effect. In our case, each camera acquires an angular surface of the hose surface of approximately a 100° of which 10° correspond to the guard zones. 5° on every side for the frame intersections with adjacent cameras. Removing these guard zones, leaves 90° that the lights illuminate as follows, from right to left: The first 90'/4 are illuminated by the first light or set of lights 23-1. These first lights 23-1 are placed to the left of the camera 22 itself, in a frontal view. The second quarter is illuminated by second lights 23-2. The third as well as the last quarter, that represent the range from 45° to 90° of the total, are illuminated in a similar and symmetrical way as the first half of the total range. The figure shows third lights 23-3 and fourth lights 23-4 that perform this task. With these four groups of lights we achieve the illumination for the complete area corresponding to camera 22 of FIG. 11, with as many groups of cameras (22) and associated lights in order to capture the full circumference of the hose surface. If in addition, we move the ring of lights with respect to the cameras along the longitudinal hose axis, we will obtain a better result in illumination and creation of the micro-shadows as desired.

None of the lights located for the illumination of the figure's camera (22), interfere geometrically with the light needed for an adjacent camera. This way, when repeating the image shown on FIG. 11 for each of the three remaining cameras (by rotating the cameras and light position 90°, three times), we would have the complete set of lights and cameras needed to take the image of a ring of the hose. The result of this is shown on the same FIG. 11, below to the right.

In short, to meet all the previous objectives, the basics of this invention can be found in the suggested geometric arrangement, that having to be compatible with the current geometry of the Pods, must allow an adequate tracking of the hose and an illumination and imagery acquisition that meets all the above mentioned. This can be achieved with the provided solution and implementation.

The fact of being able to carry out the inspection during the hose retraction in-flight, constitutes a relevant novelty that has a number of advantages such as saving time, being able to prevent damage to the hose when dragging it over the ground during extending and retracting it on the ground, avoiding human error, etc. But perhaps, the most important advantage is again the capability to detect damage on the hose. The hose's hydraulic fuel control consists of at least two valves, one at the beginning and one at the end of the hose. When maintaining the one at the end where the drogue is located closed, due to not having any connection to a receiver aircraft, and we open the valve at the beginning, the fuel pressure inside the hose increases and if any leakage exists it could be seen on one of the captured images, during the analyzing procedure of the "photo". All this without affecting the damage detection as previously stated.

On the ground this part of the procedure is impossible for safety reasons. Therefore, it might be interesting to have a real time view of the cameras (22) in the cabin to detect any leakage of the hose.

FIG. 14 shows us a cross-section of the hose's (1) longitudinal axis displaying the elements that are part of the guidance-substructure, such as the toroidal volume (18) with the cameras (22) and lights (23) and the springs (8) in charge of fitting to the wheels (19) and the fixed substructure hose-guidance skates (15). FIG. 15 displays how those skates and wheels (19) can separate in case of any irregularities around the hose, as is the case with the coupling sleeve (38) that encloses the hose (1) significantly increasing its exterior diameter.

FIG. 15 to the left shows an elevation view of a longitudinal section of the hose (1), displaying the wheels (19) and the skates together with the coupling sleeve (38) or bulging part of the hose. As seen, the wheel itself would never be able to overcome the coupling sleeve (38), as its radius is equal to the height of the coupling sleeve (38) which thus represents an obstacle. However, thanks to the skate the coupling sleeve (38) passes without problem, effortless. The skate serves as a wheel with a larger diameter without needing the space in height that an actual wheel of those dimensions would need.

Inspection Procedure

The image capturing and inspection procedures, of the cameras and lights positioning system for inspection of a hose with inclination and moving transversally, vertically and horizontally, in pitch and yaw and longitudinally as previously described, that compensates those movements in order to obtain a very high quality photo, comprises the steps as described below:

In case of this preferred implementation, where we have four illumination areas, one for each camera, we can group them in two sets: A primary set formed by the upper and lower cameras.

And another set that corresponds to the left and right cameras.

Thus, we divide each sample of the hose surface in two phases, one for each established set. The first camera (22) of the primary set, the upper one, covers an angle of 100° of the hose surface with respect to its center, being illuminated by four groups of lights (23-1, 2, 3, and 4) as shown on FIG. 11. To complete the set, this part of the ring is added to or combined with the other part of the ring that corresponds to the lower camera (22) of another 100°, that would be illuminated by other four groups of symmetric lights corresponding to the upper cameras. Both illuminated areas have no part in common on the hose surface and they can be illuminated simultaneously without interfering each other. This is how we form the primary set by grouping these illumination areas of the upper and lower camera. Likewise, we form the secondary set of lights corresponding to the left and right cameras.

The procedure is as follows.

Complete in-flight extension of the hose.

Start of the in-flight retraction of the hose.

At the same time the retraction of the hose starts, we switch-on the lights of the primary set synchronized with the image capturing by each camera of the set. This image capturing process will be repeated for every set.

We will repeat the previous step for each section of the hose, or hose ring with a frequency rate of fps.

When the hose retraction is completed, the controller will indicate this and will switch-off the lights as well as terminate image capturing by the cameras.

The system stops, waiting for the command to download the data from the memory for its afterwards processing and composing of the "photo".

NAMES OF THE ELEMENTS IN THE FIGURES

1. Hose
2. Drum
3. Pod
4. Drogue
5. Pre-set inclination arm
6. Horizontal bar slide-cylinder
7. Horizontal slide-bar
8. Skate spring
9. Substructures joining-rod
10. Structure for support and fixation to the Pod
11. Vertical slide-cylinder
12. Lugs to attach the system to the pod
13. Guidance-substructure attached to the (main) structure
14. Vertical slide-bar
15. Fixed (to the support and fixation structure, reference 10) substructure hose-guidance skate
16. Suspended guidance-substructure
17. Suspended substructure hose-guidance skate
18. Box or toroid volume with cameras and lights
19. Skate-wheel
20. Skate-wheel axle
21. Spring hitch
22. Camera
23. Light
24. Control unit
25. Aircraft system-operation system
26. Power supply
27. Control unit power supply line
28. Cameras and lights power supply line
29. Communications-bus with the aircraft
30. Longitudinal strip of the hose
31. Camera image
32. Imagery ring
33. Hose color zone
34. Cameras and lights control line
35. Power supply from the aircraft
36. Ball joint
37. Rod-spring
38. Coupling sleeve or protuberance (an increased diameter of the hose)

The fundamentals of this invention have been sufficiently described, as well as how to implement it, but it should be noted that in essence it could be implemented in other ways that differ in detail from the given examples, while still achieving the same level of assurance, as long as the basic principle is not altered, changed or modified.

The invention claimed is:

1. A cameras and lights positioning system for inspection of a hose during air-to-air refueling, comprising:
    a mechanical structure configured for attachment to a container, capsule or pod, and consisting of:
        a fixation structure (10) with a lug (12) on each end thereof for attachment to the container, capsule or pod (3),
        horizontal slide bars (7) and vertical slide bars (14), including two horizontal (7) slide bars and two vertical slide bars (14), where ends of the horizontal slide bars (7) are connected to upper and lower ends of the fixation structure (10), while the vertical slide bars (14) are mounted on a lowest horizontal slide bar of the horizontal slide bars;
    a primary guidance-substructure (13) mounted in the mechanical structure wherein the primary guidance-substructure (13) encloses the hose, and the primary guidance-substructure (13) moves with the hose and said primary guidance-substructure (13) is configured to slide over the horizontal slide bars (7) and the vertical slide bars (14) and that supports the following elements:
        a support structure,
        skate-wheels (19) configured to roll over a surface of the hose for pushing and displacing the primary guidance-substructure over the horizontal slide bars (7) and vertical slide bars (14), and
        axles (20) or bars configured to carry the skate-wheels and allow the skate-wheels to spin;
    a toroid volume provided with cameras (22) used to capture a hose surface of the hose and lights (23) for illuminating the hose and wherein the toroid volume is attached to the primary guidance-substructure (13); and
    a control subsystem with a memory, which determines when each of the lights (23) is switched on and off and when each of the cameras (22) starts and ends an exposure time, combined with a connection to an aircraft to receive commands and to download imagery, as well as a power supply and interconnection wiring; and
    wherein the primary guidance-substructure is configured to change the position of the cameras and lights to maintain a constant relative position to the hose (1) as the hose moves.

2. The cameras and lights positioning system for hose inspection during air-to-air refueling according to claim 1, further including two pairs of inclination-arms (5) which are mounted on the fixation structure (10) and that compensate an initial inclination that the hose's longitudinal axis forms with respect to a longitudinal axis of the container, capsule or Pod.

3. The cameras and lights positioning system for hose inspection during air-to-air refueling according to claim 1 wherein the primary guidance-substructure also includes: Skates (15) for tangential movement that facilitate the hose or any irregularity it may contain, such as a sleeve (38) with a larger diameter, to pass.

4. The cameras and lights positioning system for hose inspection during air-to-air refueling according to claim 3, wherein the skate-wheels (19) of the primary guidance-substructure (13) and/or the skates (15), include a set of springs (8) that fasten the skate-wheels and/or the skates to the substructure and that cushion shocks or "impacts" from the hose.

5. The cameras and lights positioning system for hose inspection during air-to-air refueling according to claim 1, that additionally comprises a secondary guidance-substructure (16) that encloses the hose, suspended from the primary guidance-substructure (13) that moves with the hose and including:
 a support substructure,
 sliding wheels configured to roll over the hose surface and to allow the hose to push and displace the secondary guidance-substructure, and
 axles or bars to carry the sliding wheels and allow the sliding wheels to spin;
 wherein the primary guidance-substructure (13) and the secondary guidance-substructure (16) are connected with substructure joining-rods (9) that are composed of an extensible element that is attached to ball joints (36) fixed to each of the primary guidance-substructure (13) and the secondary guidance-substructure (16), and where also the toroidal volume (18) with the lights (23) and cameras (22) is attached to the joining-rods (9).

6. The cameras and lights positioning system for hose inspection during air-to-air refueling according to claim 1, wherein the primary guidance-substructure and/or the secondary guidance-substructure also consist of: skates (17) for tangential movement that facilitate the hose or any irregularity it may contain, such as a coupling sleeve (38) with a larger diameter, to pass.

7. The cameras and lights positioning system for hose inspection during air-to-air refueling according to claim 5, wherein the sliding wheels (19) of the secondary guidance-substructure (16) and/or the skates (17) of the secondary guidance-substructure (16) have a set of springs (8) that fasten the skates (17) to the secondary guidance-substructure and that cushion shocks or impacts from the hose.

8. The cameras and lights positioning system for hose inspection during air-to-air refueling according to claim 1, wherein the primary guidance-substructure in the horizontal slides bars (7) and in the vertical bars (14) is comprised of cylinders which slide over said horizontal slide bars (7) and said vertical slide bars (14), allowing movement of the system by the hose movement.

9. The cameras and lights positioning system for hose inspection during air-to-air refueling according to claim 1, wherein in addition, some of the lights (23) of the toroid volume used to illuminate the hose (1) surface are polarized.

10. The cameras and lights positioning system for hose inspection during air-to-air refueling according to claim 1, wherein at least one of the cameras (22) of the toroid volume used to capture the hose surface includes a lens that is polarized.

11. The cameras and lights positioning system for hose inspection during air-to-air refueling according to claim 1, wherein the lights (23) are of various wavelengths and are set up at different angles to illuminate the hose surface (1).

12. The cameras and lights positioning system for hose inspection during air-to-air refueling according to claim 1, wherein the cameras (22) have distinct filters on different pixels of an image sensor thereof in order to see specific wavelengths and no others.

13. The cameras and lights positioning system for hose inspection during air-to-air refueling according to claim 1, wherein the cameras (22) have a redundant configuration, so that in case of failure of any of the cameras a remainder of the cameras can form a complete image around a surface of the hose (1).

14. The cameras and lights positioning system for hose inspection during air-to-air refueling according to claim 1, wherein either the cameras or the control subsystem have a capability to compress the imagery from the cameras in order to reduce an amount of information needed to recompose a photo of the hose (1) surface.

15. The cameras and lights positioning system for hose inspection during air-to-air refueling according to claim 1, further comprising an electronic medium on which runs a program that composes a photo of the hose (1) surface, when the imagery is captured by the different cameras (22).

16. The cameras and lights positioning system for hose inspection during air-to-air refueling according to claim 1, further comprising an electronic medium on which runs a program that analyzes a photo of the hose surface and detects critical areas of damage that might exist on the hose surface.

17. The cameras and lights positioning system for hose inspection during air-to-air refueling according to claim 1, further including energy storage elements such as supercapacitors, from which to extract the energy needed for the lights (23) and to avoid charging an aircraft with peak power demands when switching the lights on.

18. The cameras and lights positioning system for hose inspection during air-to-air refueling according to claim 1, wherein the areas of the hose to be illuminated are arranged so that each area corresponds to a camera, except for guard zones, first quarter from 0° to 22.5° will be illuminated by a first light or a set of lights (23-1), placed next to the camera (22) as seen from a front view; a second quarter from 22.5° to 45° will be illuminated by second lights (23-2), where a third quarter from 45° to 67.5° will be illuminated by a fourth lights (23-3) and a fourth quarter from 67.5° to 90° illuminated by fourth lights (23-4) where the third lights (23-3) and fourth lights (23-4) are symmetrical to the first quarter and second quarter.

* * * * *